US010459836B2

United States Patent
Liu et al.

(10) Patent No.: US 10,459,836 B2
(45) Date of Patent: Oct. 29, 2019

(54) MEMORY DEVICE AND ASSOCIATED CONTROL METHOD

(71) Applicant: MACRONIX INTERNATIONAL CO., LTD., Hsinchu (TW)

(72) Inventors: Chia-He Liu, Hsin-chu (TW); Jian-Shing Liu, Hsin-chu (TW)

(73) Assignee: MACRONIX INTERNATIONAL CO., LTD., Hsin-Chu (TW)

( * ) Notice: Subject to any disclaimer, the term of this patent is extended or adjusted under 35 U.S.C. 154(b) by 97 days.

(21) Appl. No.: 15/629,845

(22) Filed: Jun. 22, 2017

(65) Prior Publication Data
US 2018/0373625 A1   Dec. 27, 2018

(51) Int. Cl.
*G06F 12/00* (2006.01)
*G06F 12/02* (2006.01)
*G06F 13/16* (2006.01)
*G06F 11/00* (2006.01)

(52) U.S. Cl.
CPC .......... *G06F 12/0246* (2013.01); *G06F 11/00* (2013.01); *G06F 13/1668* (2013.01); *G06F 2212/1036* (2013.01); *G06F 2212/7209* (2013.01)

(58) Field of Classification Search
None
See application file for complete search history.

(56) References Cited

U.S. PATENT DOCUMENTS

| 7,583,545 | B2 | 9/2009 | Lasser |
| 8,094,508 | B2 | 1/2012 | Gatzemeier et al. |
| 8,929,143 | B2 | 1/2015 | Suzuki |
| 9,146,821 | B2 | 9/2015 | Byom et al. |
| 9,514,834 | B2 | 12/2016 | Hung et al. |
| 2015/0161148 | A1* | 6/2015 | Randell ............. G06F 17/30085 707/662 |
| 2018/0188984 | A1* | 7/2018 | Tai ....................... G06F 12/0253 |

\* cited by examiner

*Primary Examiner* — John A Lane
(74) *Attorney, Agent, or Firm* — McClure, Qualey & Rodack, LLP

(57) ABSTRACT

A memory device and associated control method are provided. The memory device includes a memory array and a control circuit, which are electrically connected with each other. The memory array includes a plurality of memory groups. A first memory group among the plurality of memory groups includes at least one first memory unit. The control circuit executes the control method including following steps. Firstly, a first timestamp corresponding to a first time point is recorded when one of the at least one first memory unit is programmed. Then, state of the first memory group is identified based on the first timestamp and an identification rule, and the first memory group is retired when a condition being predefined in the identification rule is satisfied.

20 Claims, 12 Drawing Sheets

MEMORY DEVICE AND ASSOCIATED CONTROL METHOD

FIELD OF THE DISCLOSURE

The disclosure relates in general to a memory device and associated control method, and more particularly to a memory device and associated control method capable of identifying state of the memory group.

BACKGROUND OF THE DISCLOSURE

Endurances of memory cells of non-volatile memories, for example, flash memories, are limited. Once a memory cell endures a certain number of writing and erasing cycles, the memory cell becomes worn out, and data stored in the memory cell will lose.

FIG. 1 (prior art) is a schematic diagram illustrating the stage transition of a memory unit (MU1) in a memory device. A memory device 10 includes a control circuit 11 and a memory array 13, and the memory array 13 further includes multiple memory units (MUs). For the sake of illustration, only two of the memory units are shown. Usually, the endurance of the memory unit can be represented as four different stages, a fresh stage (stage I), a stable stage (stage II), a risky stage (stage III), and a failure stage (stage IV). The four stages of memory unit MU1 are briefly described below.

The upper left corner of FIG. 1 shows that both the memory unit MU1 and memory unit MU2 are at their fresh stage at the beginning. That is, the memory array 13 is newly erased and both the memory unit MU1 and memory unit MU2 are empty.

At the upper right corner of FIG. 1, the grids of the memory unit MU1 represent that the memory unit MU1 is at the stable stage. When a memory unit is at the stable stage, the data stored in the memory unit can be safely retrieved.

At the lower right corner of FIG. 1, the diagonal stripes of the memory unit MU1 represent that the memory unit MU1 is at the risky stage. When a memory unit is at the risky stage, the data stored in the memory unit can still be retrieved, but more consequential accesses to the memory unit may cause failure.

At lower left corner of FIG. 1, the saltires of the memory unit MU1 represent that the memory unit MU1 is at the failure stage. When a memory unit is at the failure stage, data retention errors occur and the data previously stored in the memory unit are no longer available.

Therefore, once the memory unit is at the risky stage, consequential access to the memory unit should be avoided. Alternatively speaking, it is important to identify whether the memory unit is about to be at the failure stage in advance.

SUMMARY OF THE DISCLOSURE

The disclosure is directed to a memory device and a control method applied to the memory device. With the control method, the memory device is capable of identifying state of its memory groups, and the data content of the memory group being retired is backed up in advance.

According to a first aspect of the present disclosure, a memory device is provided. The memory device includes a memory array and a control circuit. The memory array includes a first memory group and the first memory group includes at least one first memory unit. The control circuit is electrically connected to the memory array. The control circuit firstly records a first timestamp corresponding to a first time point when one of the at least one first memory unit is programmed. Then, the control circuit identifies state of the first memory group based on the first timestamp and an identification rule. The control circuit retires the first memory group when a condition being predefined in the identification rule is satisfied.

According to a second aspect of the present disclosure, a control method applied to a memory device is provided. The memory device includes a plurality of memory groups, wherein a first memory group among the plurality of memory groups includes at least one first memory unit. The control method includes following steps. Firstly, a first timestamp corresponding to a first time point is recorded when one of the at least one first memory unit is programmed. Then, state of the first memory group is identified based on the first timestamp and an identification rule. The first memory group is retired when a condition being predefined in the identification rule is satisfied.

The above and other aspects of the disclosure will become better understood with regard to the following detailed description of the preferred but non-limiting embodiment(s). The following description is made with reference to the accompanying drawings.

BRIEF DESCRIPTION OF THE DRAWINGS

FIG. 7 is a schematic diagram illustrating an exemplary storage state of a memory device including multiple memory groups.

FIGS. 8A-8C are schematic diagrams illustrating different memory units MU in the memory group MG can be freely selected to acquire the symbolic timestamps tMGsym corresponding to the memory groups MG.

FIG. 13 is a schematic diagram illustrating that data content of the memory groups being identified as risky based on the second exemplary identification rule needs to be copied to an empty memory group.

FIG. 14 is a schematic diagram illustrating the memory device after memory group being identified as risky is actually retired based on the second exemplary identification rule.

DETAILED DESCRIPTION OF THE DISCLOSURE

This disclosure proposes a memory device and associated control method. According to the embodiment of the present disclosure, a time point being represented in a timestamp is simultaneously programmed and recorded when a memory unit of a memory group is programmed with data content. Based on the programmed timestamp and an identification rule, a control circuit can identify whether the memory group is risky.

In a case that the memory group is identified to be risky, the control circuit may further perform a retention examination to the memory group. If the retention examination shows that the bits fail ratio of the memory group is too high, the memory group should be retired. In addition, data contents of the memory group including the memory unit (that is, source memory group MGsrc) are copied to another memory group (that is, destination memory group MGdst). With the control method, the memory group in the memory device is retired before actually changing to the failure stage. Therefore, the data safety of the memory groups in the memory device is ensured.

Figure 1:
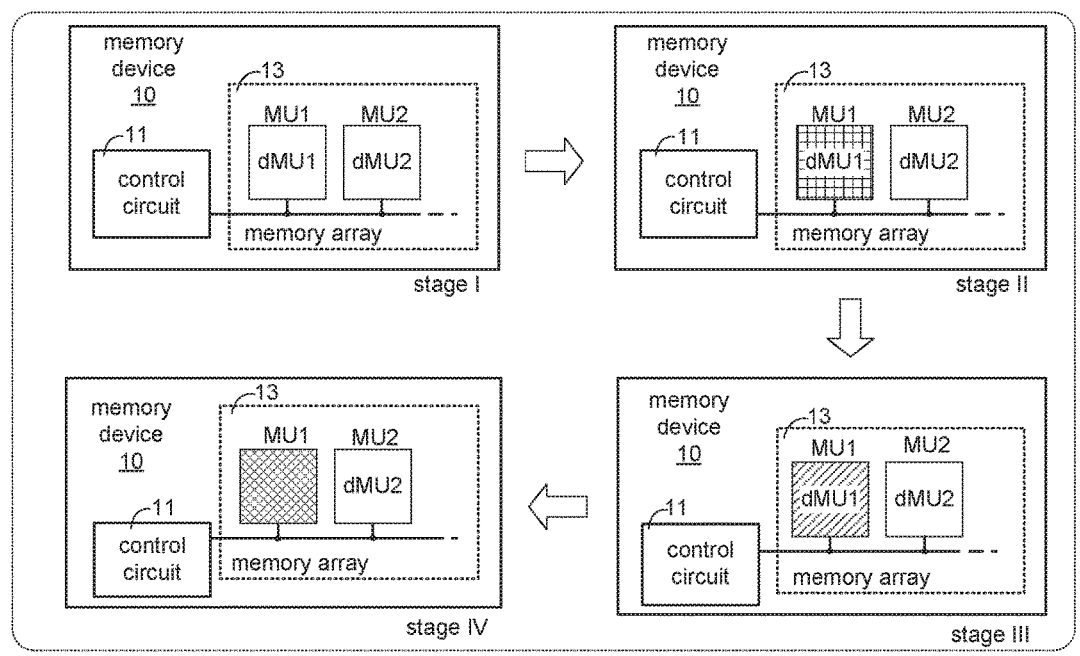
FIG. 1 (prior art) is a schematic diagram illustrating the stage transition of a memory unit (MU1) in a memory device.
Figure 2:
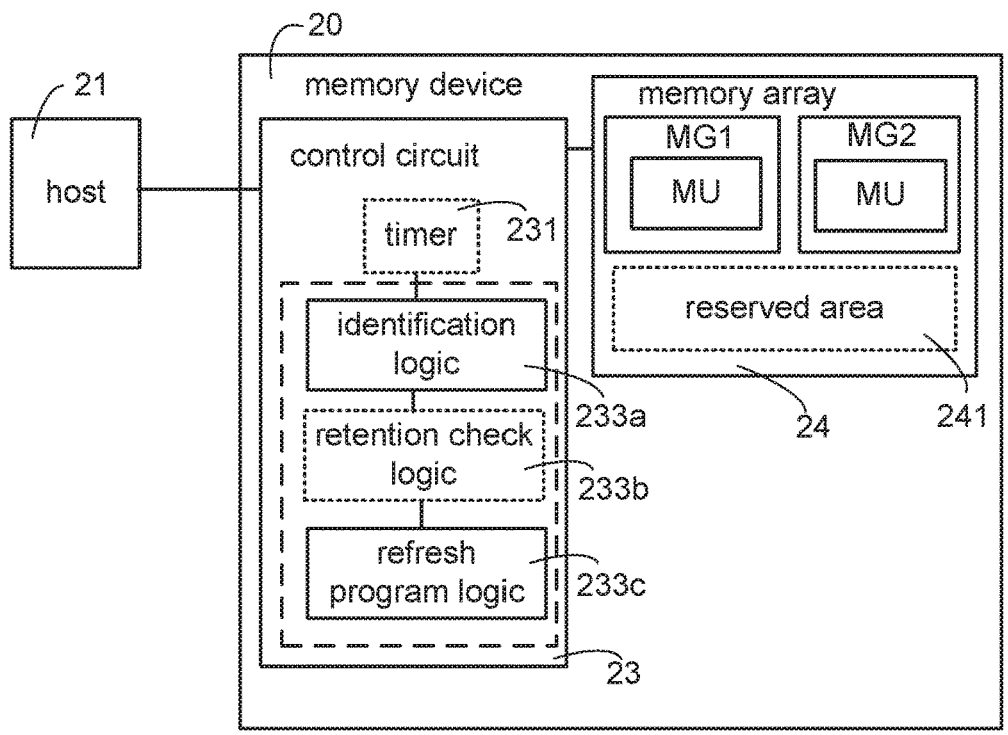
FIG. 2 is a schematic block diagram illustrating the memory device according to the embodiment of the present disclosure.

FIG. 2 is a schematic block diagram illustrating the memory device according to the embodiment of the present disclosure. A memory device 20 is electrically connected to a host 21, and the memory device 20 operates in response to commands from the host 21. The memory device 20 can be an embedded multi-media card (hereinafter, eMMC), a Universal Flash Storage (hereinafter, UFS), a solid stage drive (hereinafter, SSD device) and so forth.

The memory device 20 includes a control circuit 23 and a memory array 24. The control circuit 23 includes an identification logic 233a, a retention check logic 233b, and a refresh program logic 233c. The control circuit 23 may further include a timer 231. The memory array 24 includes multiple memory cells. The memory cells can be, for example, a single-level cell (hereinafter, SLC), a multi-level cell (hereinafter, MLC) or a triple-level cell (hereinafter, TLC).

In FIG. 2, two memory groups MG1, MG2 are shown for illustration. Each of the memory groups MG1, MG2 includes at least one memory unit MU. Moreover, the memory array 24 may include a reserved area 241.

Depending on a command type, the memory array 24 might be accessed in different units. For example, the memory array 24 is usually erased in unit of memory groups MG and programmed (written) in the unit of memory units MU. Size of the memory group MG is greater than or equivalent to the size of the memory unit MU. In some occasions, the memory group MG can be a block, and the memory unit MU can be a page. However, the physical sizes of the memory unit MU and the memory group MG are not limited.

Figure 4:
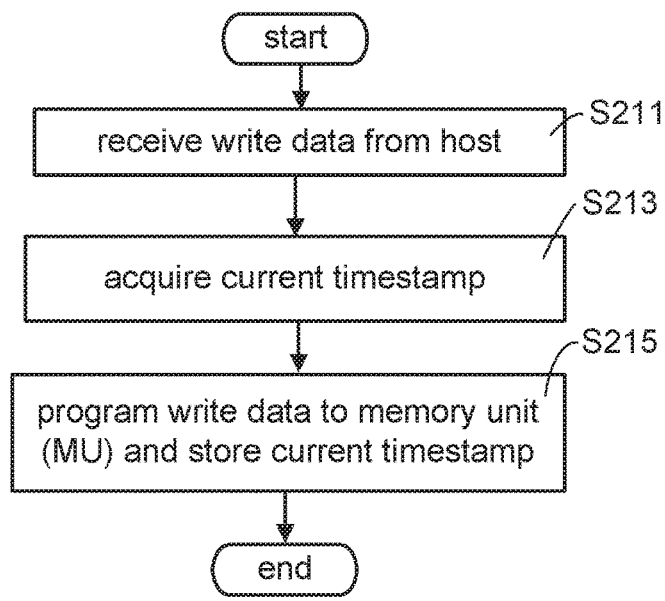
FIG. 4 is a schematic flow diagram illustrating the write operation applied to the memory unit MU1 in the memory device.
Figure 5A:
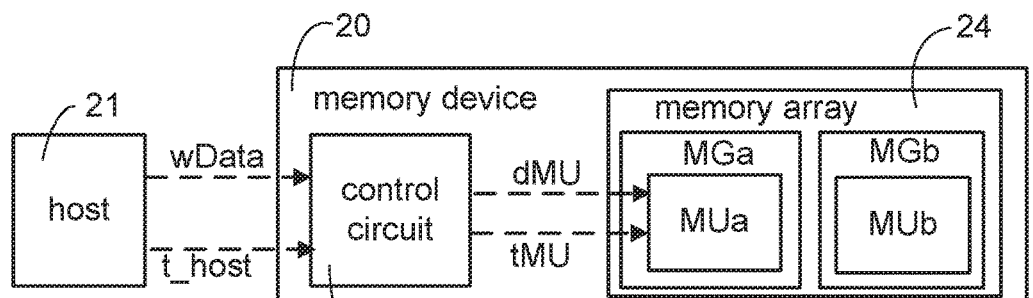
FIG. 5A is a schematic diagram illustrating signal transmission of the memory device during the write operation.
Figure 5B:
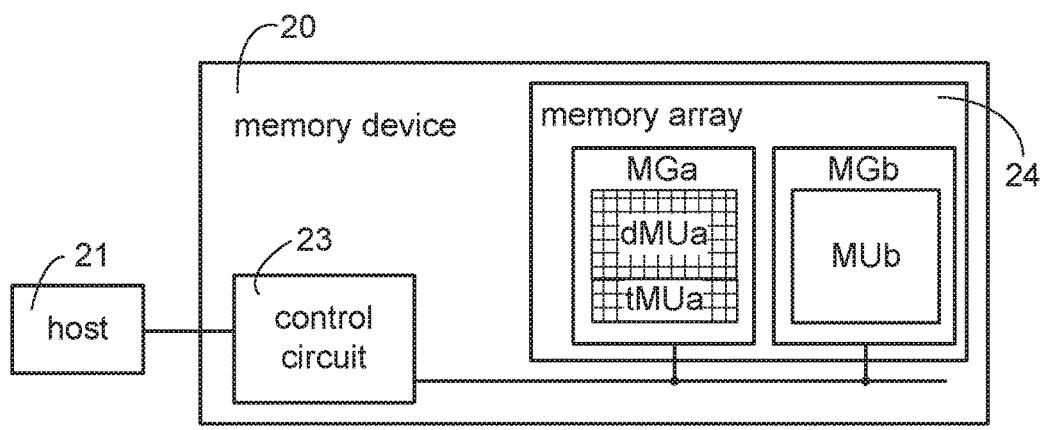
FIG. 5B is a schematic diagram illustrating the storage state of the memory device after the write operation.

The control method applied to the memory device 20 includes a write operation in the normal operation mode and a monitor procedure. The write operation in the normal operation mode is illustrated in FIGS. 4, 5A, 5B, and an identification operation, a retention examination and a retention program operation performed in the monitor procedure are illustrated in FIGS. 6-14.

Figure 3:
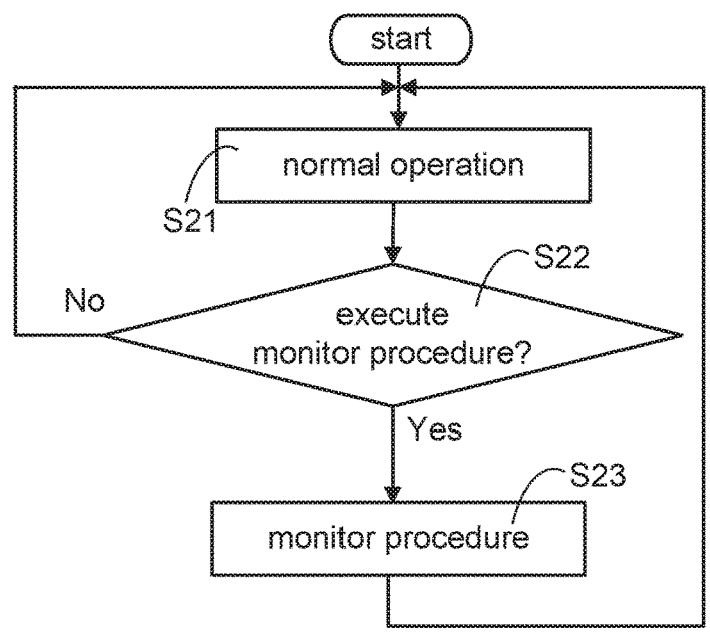
FIG. 3 is a schematic flow diagram illustrating the operation of the memory device.

FIG. 3 is a schematic flow diagram illustrating the operation of the memory device. Usually, the control circuit 23 controls the memory device 20 in a normal operation mode (step S21). In the normal operation mode, the memory device may execute a write operation, a read operation, an erase operation and so forth. Then, the control circuit 23 determines if the monitor procedure should be executed (step S22). The time point that the control circuit 23 determines whether to execute the monitor procedure is not limited. For example, the monitor procedure can be executed whenever the memory device 20 is empowered or based on a periodic basis (for example, once a week or once a month, etc.).

If the determination result of step S22 is negative, the memory device 20 stays in the normal operation mode. If the determination result of step S22 is positive, the control circuit 23 executes the monitor procedure (step S23) and returns to the normal operation mode.

Data retention errors, caused by charge loss over time after a flash memory cell is programmed, are the dominant reason for flash memory error. Alternatively speaking, the earlier the flash memory cell is programmed, the more charges are lost. Therefore, the capability of identifying memory cells which are programmed relatively earlier implies that flash memory cells having a high potential of charge loss can be found. In order to do so, a timestamp of a current time point is recorded when a memory unit MU is programmed with data at the same time. The recorded timestamp can be referred to trace back the time point that the memory unit MU is programmed.

The recorded timestamp is then used in the monitor procedure to determine cold degrees of the memory groups MG. When the memory group MG whose corresponding timestamp is relatively early, the memory group MG is considered as being relatively cold, and vice versa. For the relatively cold memory groups, chances of having data retention errors increase. According to the embodiment of the present disclosure, an identification rule is used to identify the state of the used memory groups MG in response to a comparison between the time point represented by the recorded timestamp of the used memory groups MG and a current time point.

When the comparison between a time point acquired from the recorded timestamp corresponding to a used memory group MG and the current time point shows that a condition as being predefined in the identification rule is satisfied, the retention examination is performed to the used memory group MG. Once the result of the retention examination further shows that the data content in the used memory group MG tends to exceed a ratio threshold based on an error correction code (hereinafter, ECC) algorithm, the used memory group MG is identified to be risky. Alternatively speaking, the identification rule can identify whether the memory group is at the risky stage based on satisfaction of the predefined condition and result of the retention examination.

FIG. 4 is a schematic flow diagram illustrating the write operation applied to the memory unit MU in the memory device. The write operation is executed in the normal operation mode. Firstly, the control circuit 23 receives the data content from the host 21 (step S211). Then, the control circuit 23 acquires a current time point in the form of a current timestamp (step S213). The current timestamp represents the current time point when the control circuit 23 performs the write operation. The current timestamp can be acquired from the host 21 or the timer 231. When the control circuit 23 programs the data content to the memory unit MU, the current timestamp is programmed at the same time (step S215).

FIG. 5A is a schematic diagram illustrating signal transmission of the memory device during the write operation. FIG. 5A is corresponding to steps S211 and S213 in FIG. 4. In the context, a prefix "d" is used to represent a data, and a prefix "t" is used to represent a timestamp. Therefore, data to be programmed to or read from the memory unit MU is represented as dMU, and the timestamp to be programmed to or read from the memory unit MU is represented as tMU. The timestamp can be represented in a formation of power cycle count, host active (write/read) count, or day(s) and so forth.

The control circuit 23 receives write data wData and the current timestamp t_host from the host 21. Then, the control circuit 23 can transform the write data wData and the current timestamp t_host to the format suitable for the memory array 24. That is, a transformed write data dMU and a transformed current timestamp tMU are generated accordingly. Then, the control circuit 23 programs the transformed write data dMU and the transformed current timestamp tMU to the memory unit MUa of the memory group MGa.

The place of storing the timestamps corresponding to the memory units is not limited. For example, the timestamps can be recorded at the reserved area 241 in the memory array 24. Moreover, the control circuit 23 may include a volatile memory for temporarily storing the timestamps when the memory device 20 is active. In a case that the timestamps and the data content are separately stored, mapping information should be updated and maintained. Details about various implementations about storing the timestamps and layout of the memory units and the memory groups are not illustrated.

Alternatively, according to the embodiment of the present disclosure, the memory unit MUa in the memory group MGa can include two areas, a storage area for storing the data content and a spare area for recording the timestamp. For the sake of illustration, in the flowing descriptions, the timestamp corresponding to the time point that data content is programmed to the memory unit is stored in the spare area of the memory unit.

FIG. 5B is a schematic diagram illustrating the storage state of the memory device after the write operation. FIG. 5B is corresponding to the state the memory device 20 after step S215 in FIG. 4 is executed. In FIG. 5B, only the memory group MGa is used. Therefore, the grids represent that the memory unit MUa of the memory group MGa is at the stable stage, and the white rectangle represents that the memory unit MUb of the memory group MGb is at the fresh stage.

After the write operation, the storage area of memory unit MUa in memory group MGa stores the data content dMUa and the spare area of memory unit MUa in memory group MGa stores the timestamp tMUa corresponding to the time point when the memory unit MUa is programmed with data content. Continuing the previous example, the memory group MGa is illustrated as an example in the following flow diagram. However, in practical, the flow diagram can be applied to any of the memory groups having been programmed/written with data content in the memory array 24.

Figure 6:
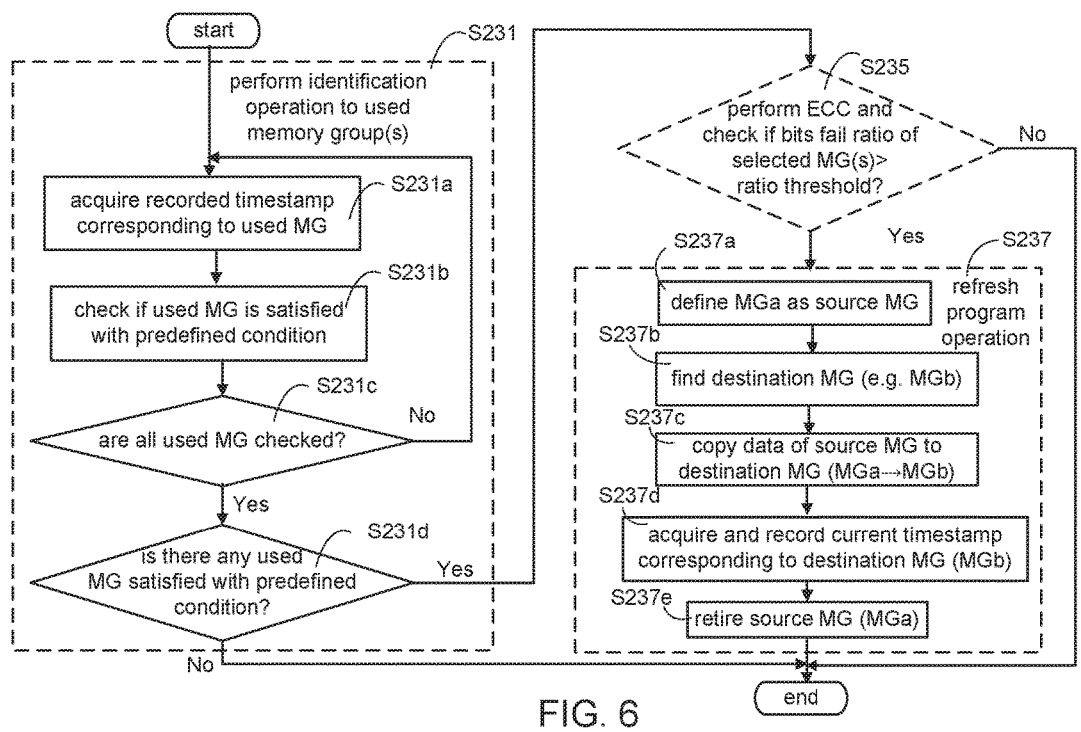
FIG. 6 is a schematic flow diagram illustrating the control method applied to the memory device according to an embodiment of the present disclosure.

FIG. 6 is a schematic flow diagram illustrating the control method applied to the memory device according to an embodiment of the present disclosure. The flow in FIG. 6 is executed in the monitor procedure (step S23 of FIG. 3). Firstly, an identification operation is performed. In the identification operation, the identification logic 233a determines whether the used memory group is satisfied with the predefined condition based on the recorded timestamps (step S231). The identification logic 233a can perform the identification operation whenever the memory device 20 is empowered, or based on a periodic basis (for example, once a week or once a month etc.). The step S231 further includes following steps.

The control circuit 23 acquires the recorded timestamp corresponding to the used memory group MGa (Step s231a), and checks if the used memory group MGa is satisfied with the predefined condition based on the recorded timestamp (step S231b). Then, the control circuit 23 recursively performs steps S231a and S231b until all the used memory groups MG in the memory array are checked with the predefined condition (step S231c). Basically, the identification rule is utilized to check with the used memory groups in order to find which of these used memory groups are risky. Different examples of the identification rule will be illustrated later.

Then, the control circuit 23 checks if any of the used memory groups MG is identified as risky by identifying whether the used memory groups MG satisfied with the predefined condition (step S231d). In a case that a used memory group MG is satisfied with the predefined condition, the used memory group MG is identified as risky, and vice versa. If the determination result of step S231d is negative, the flow ends. If the determination result of step S231d is positive, the retention check logic 233b performs the retention examination to the memory group being identified as risky (step S235), and the refresh program logic 233c selectively performs a refresh program operation to the memory group being identified as risky (step S237).

In step S235, the retention check logic 233b performs an ECC algorithm and checks if bits fail ratio of the risky memory group MG is greater than a ratio threshold ERRth (step S235). Selection of the ECC algorithm being used is not limited. The ratio threshold ERRth can be set to be a value slightly lower than the capability of the ECC algorithm. For example, if the ECC algorithm is capable of fixing 10 bits error, the ratio threshold can be set to be 8 bits. While executing step S235, the error bits in the memory group being identified as risky are repaired at the same time. If the determination result of step S235 is negative, the memory group being identified as risky is determined to be not at the risky stage and the flow ends.

If the determination result of step S235 is positive, the refresh program logic 233c then performs the refresh program operation to the memory group MG being identified as risky. Alternatively speaking, the memory group MG being identified as risky is confirmed to be at the risky stage and needs to be retired.

In some applications, the use of the retention check logic 233b (step S235) can be omitted. That is, whenever a memory group MG is satisfied with the predefined condition, the memory group MG is immediately identified as being risky, and its data contents are copied to another memory group MG immediately.

In the refresh program operation (step S237), the memory group MG being identified as risky and confirmed to be retired is defined as a source memory group MGsrc (S237a), and a destination memory group MGdst is found (step S237b). The destination memory group MGdst is a memory group at the fresh stage, for example, the memory group MGb in FIG. 5B. Then, the data stored at the source memory group MGsrc are copied to the destination memory group MGdst (step S237c).

In addition, the control circuit 23 acquires a new current timestamp from the host 21 or the timer 231 and records the newly acquired current timestamp to the spare area of the destination memory group MGdst. Then, the source memory group MGsrc is retired, and the control circuit will no longer use the retired memory group MGsrc for programming (step S237e).

In short, the control circuit 23 firstly performs an identification operation to used memory groups in the memory array 24. After performing the identification operation, the control circuit 23 selectively retires the used memory group MGa. The used memory group MGa will be retired if its corresponding timestamp tMUa is satisfied with the predefined condition and the retention examination further confirms that the data content of the memory group MG can only be barely recovered. In a case that the memory group MGa needs to be retired, the control circuit 23 then performs the refresh program operation to the memory group MGa.

In practical application, the memory array 24 may include more than two memory groups MG and each of the memory groups may include more than one memory units MU. In a case that the memory group MG includes multiple memory units MU, one of the memory units MU is selected as a symbolic memory unit MUsym, and a timestamp corresponding to the symbolic memory unit MUsym is considered as a symbolic timestamp tMGsym corresponding to the whole memory group MG.

In order to acquire the symbolic timestamp tMGsym corresponding to the memory group MG, a selection rule is applied. The selection rule defines that one of the memory units in the memory group is a default memory unit MUdflt.

In a case that the timestamp corresponding to the default memory unit MUdflt is valid, the timestamp corresponding to the default memory unit MUdflt is directly utilized as the symbolic timestamp corresponding to the memory group MG. In a case that the timestamp corresponding to the default memory unit MUdflt is not valid, a substitute memory unit MUsub is defined, and the timestamp corresponding to the substitute memory unit MUsub is utilized as the symbolic timestamp tMGsym corresponding to the memory group MG.

Figure 7:
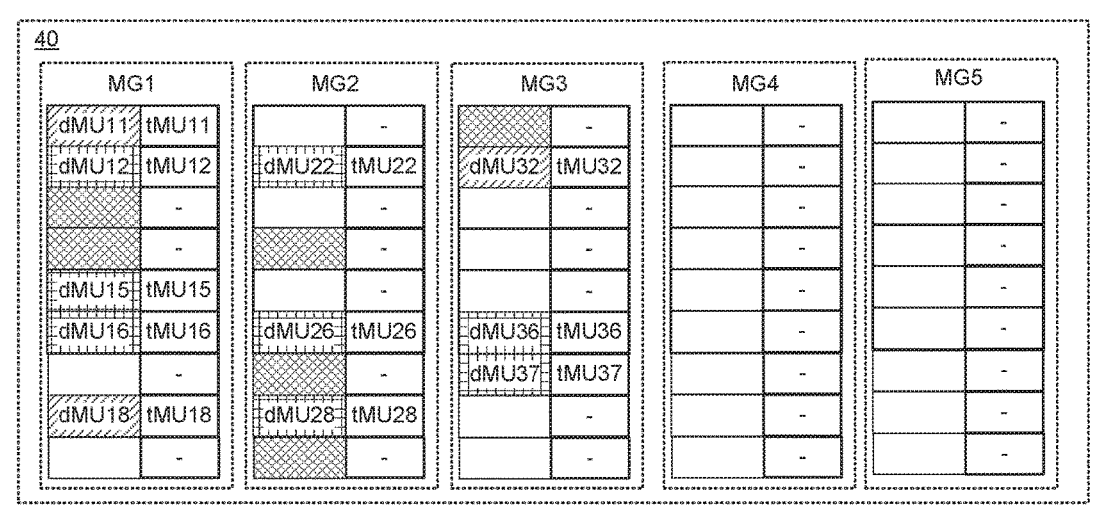

FIG. 7 is a schematic diagram illustrating an exemplary storage state of a memory device including multiple memory groups. The memory array 40 includes memory groups MG1~MG5, and each memory group MG1~MG5 includes multiple memory units. For example, the memory group MG1 includes memory units MU11~MU19, and each of the memory units MU11~MU19 includes a storage area (left part) for storing data content and a spare area (right part) for storing timestamp.

For the memory group MG1, memory units MU17, MU19 are not used, the memory units MU11, MU12, MU15, MU16, MU18 are used. Among the used memory units in the memory group MG1, the memory units MU12, MU15 and MU16 are at the stable stage, the memory unit MU11 and MU18 are at the risky stage, and memory units MU13, MU14 are at the failure stage.

The timestamp corresponding to the used memory units which are at the stable stage and the risky stage are stored. That is, the timestamp tMU11 corresponding to the memory unit MU11, the timestamp tMU12 corresponding to the memory unit MU12, the timestamp tMU15 corresponding to the memory unit MU15, the timestamp tMU16 corresponding to the memory unit MU16, and the timestamp tMU18 corresponding to the memory unit MU18 are stored. Once the memory unit is at the failure stage, for example, the memory units MU13 and MU14, the data content and timestamp cannot be accessed.

The symbols related to the memory units MU21~MU29 and MU31~MU39 of memory groups MG2 and MG3 are similar and not redundantly described. In FIG. 7, the memory groups MG4, MG5 are assumed to be not used.

Figure 8A:
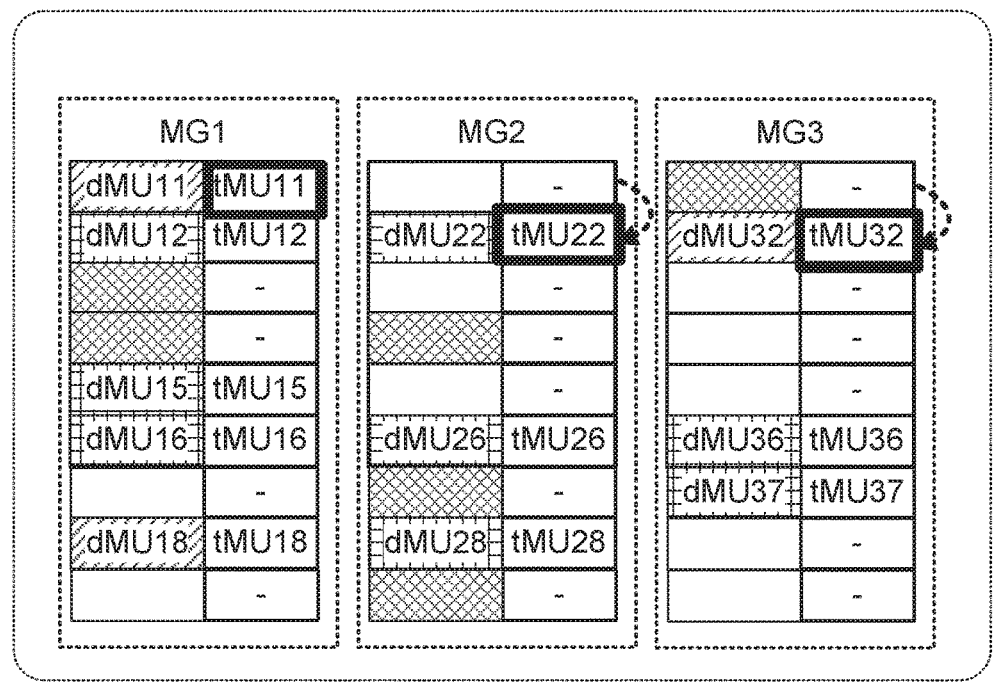
Figure 8B:
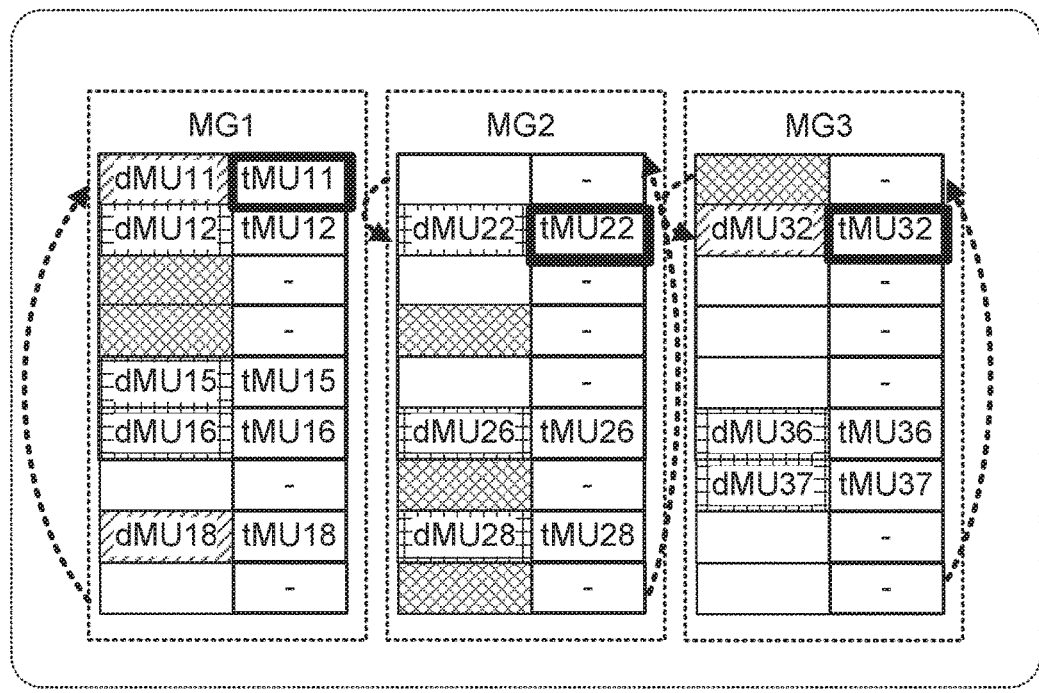
Figure 8C:
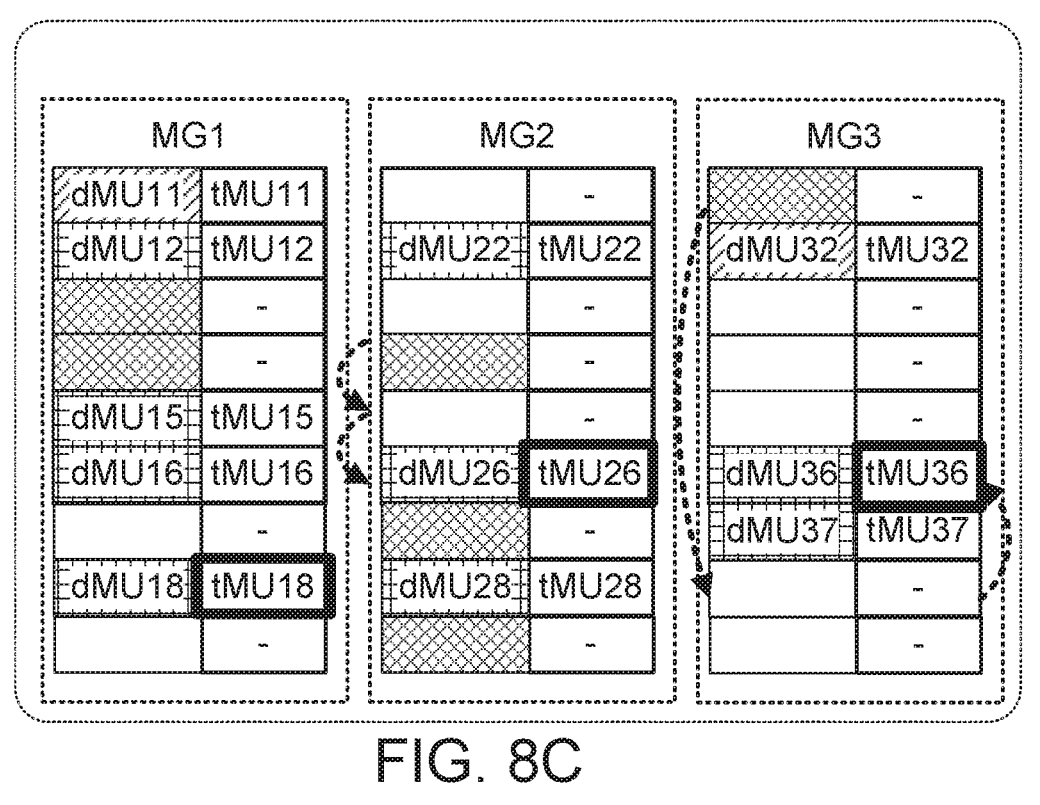

FIGS. 8A-8C are schematic diagrams illustrating different memory units MU in the memory group MG can be freely selected to acquire the symbolic timestamps tMGsym corresponding to the memory groups MG. In FIGS. 8A~8C, the timestamp corresponding to the substitute memory unit MUsub is acquired if the timestamp corresponding to the default memory unit MUdflt is not valid. The dotted arrows show the searching process of finding the substitute memory unit MUsub, and the blocked frames represent the symbolic timestamps tMGsym which are actually selected.

In FIG. 8A, the memory unit MU located at the initial address in each memory group MG is defined as the default memory unit MUdflt. For the memory group MG1, the memory unit MU11 is at the risky stage, and the timestamp tMU11 is available. Therefore, the timestamp tMU11 is defined as symbolic timestamp tMGsym corresponding to the memory group MG1.

For the memory group MG2, the memory unit MU21 is not used and there is no timestamp corresponding to the memory unit MU21. Therefore, the memory unit MU22 is selected as the substitute memory unit MUsub, and the timestamp corresponding to the memory unit MU22, that is tMU22, is used as the symbolic timestamp tMGsym corresponding to the memory group MG2.

For the memory group MG3, the memory unit MU31 is at the failure stages there is no valid timestamp corresponding to the memory unit MU31. Therefore, the memory unit MU32 is selected as the substitute memory unit MUsub, and the symbolic timestamp tMGsym corresponding to the memory unit, MU32, that is tMU32, is used as the timestamp corresponding to the memory group MG3.

Then, based on these symbolic timestamps tMGsym (tMU11, tMU22 and tMU32), the predefined condition, and the retention examination result, the identification logic 233a identifies whether any of the memory groups MG1~MG3 is risky.

In FIG. 8B, the memory unit MU located at the final address of each memory group is defined as the default memory unit MUdflt. Again, not all the timestamps corresponding to the default memory unit MUdflt are available. According to FIG. 8B, the timestamps corresponding to the memory units MU11, MU22, and MU32 are selected and utilized as the symbolic timestamps tMGsym corresponding to the memory groups MG1~MG3.

In FIGS. 8A and 8B, the substitute memory unit MUsub is selected based on a sequential order. On the other hand, FIG. 8C shows that selections of the default memory unit MUdflt and the substitute memory unit MUsub can be random.

In FIG. 8C, a randomly selected memory unit MU in each memory group MG is defined as the default memory unit MUdflt. For the memory group MG1, the memory unit MU18 is selected as the default memory unit MUdflt, and the timestamp tMU18 is available. Therefore, the timestamp corresponding to the memory unit MU18, that is tMU18, is used to the symbolic timestamp tMGsym corresponding to the memory group MG1.

For the memory group MG2, the memory unit MU24 is selected as the default memory unit MUdflt. However, the memory unit MU24 is at the failure stage. Therefore a memory unit MU25 is selected as a substitute memory unit MUsub. However, the memory unit MU25 is at the fresh stage so that the memory unit MU26 is selected again as the substitute memory unit MUsub. Therefore, the timestamp corresponding to the memory unit MU26, that is tMU26, is the symbolic timestamp tMGsym corresponding to the memory group MG2.

For the memory group MG3, the memory unit MU31 is first selected but the memory unit MU31 is at the failure stage, and there is no valid timestamp. Therefore, the memory unit MU38 is selected as the substitute memory unit MUsub. However, the memory unit MU38 is empty so that another memory unit MU36 is selected as the substitute memory unit MUsub again. Therefore, in FIG. 8C, the timestamp corresponding to the memory unit MU36, that is tMU36, is the symbolic timestamp tMGsym corresponding to the memory group MG3.

The selection of the default memory unit is not limited to the examples shown in FIGS. 8A-8C. It is possible that one and only one timestamp corresponding to each memory group is stored. For example, only the timestamps corresponding to the first programmed memory units in the memory groups MG is stored and used as the symbolic timestamps tMGsym corresponding to the memory groups. In other words, the selection of the symbolic timestamp tMGsym corresponding to the memory group is flexible.

Figure 9A:
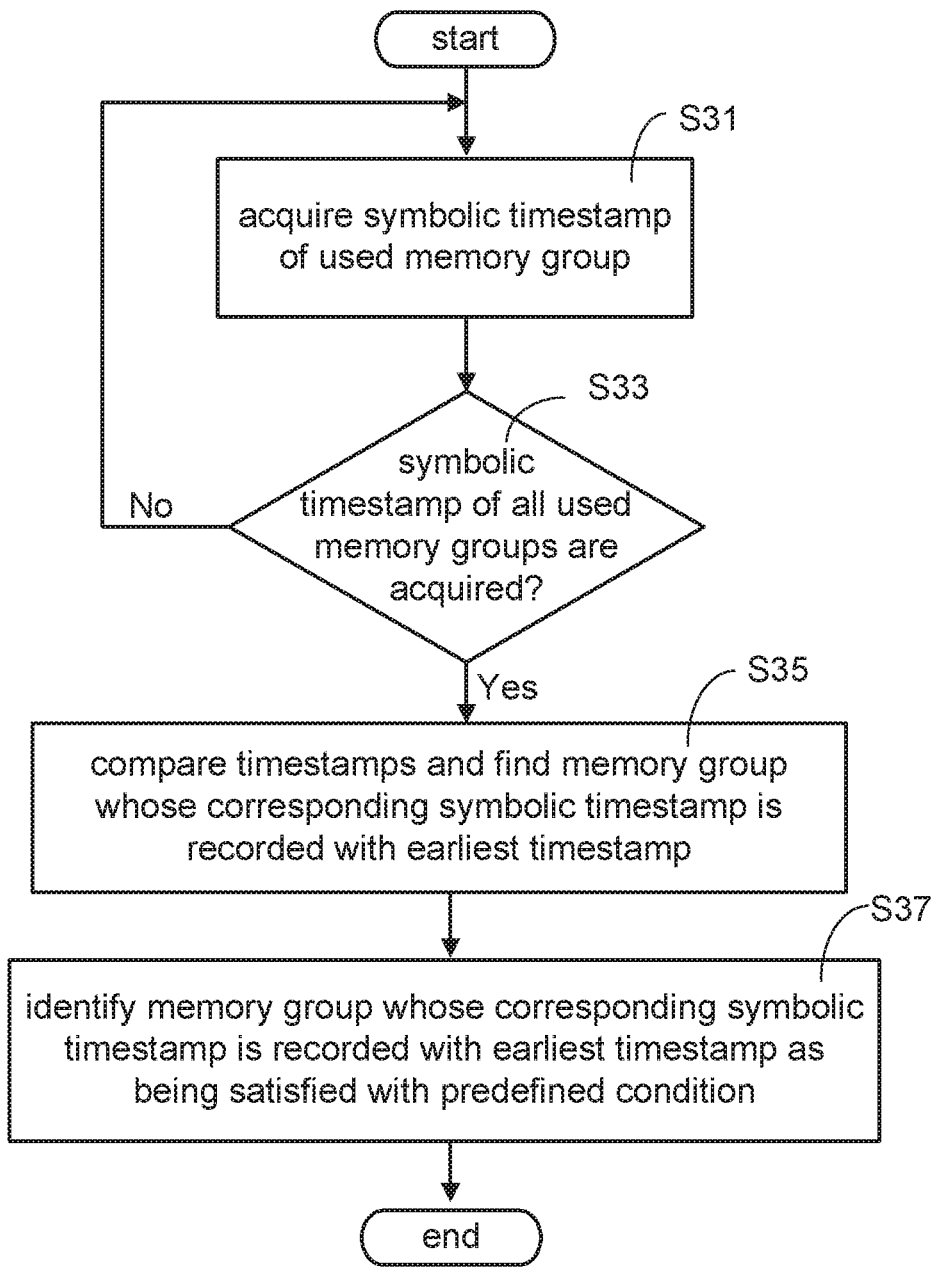
FIG. 9A is a schematic flow diagram illustrating an exemplary identification rule.

FIG. 9A is a schematic flow diagram illustrating an exemplary identification rule. Firstly, a symbolic timestamp tMGsym corresponding to the used memory group MG is acquired (step S31). As illustrated above, the memory unit corresponding to the symbolic timestamp tMGsym can be located at an initial address in the memory group MG, a final address in the memory group MG, or a randomly selected address in the memory group MG.

Then, the control circuit 23 checks if all the symbolic timestamps tMGsym corresponding to the used memory groups are already acquired (step 33). If the determination result of step S33 is negative, step S31 is repeatedly executed.

If the determination result of step S33 is positive, all the acquired timestamps are compared in order to find out which of the symbolic timestamps tMGsym is recorded with the earliest timestamp (step S35). Then, the memory group corresponding to the earliest timestamp is recognized as being satisfied with the predefined condition (step S37). Based on the control flow in FIG. 9B, there is always one memory group MG that is satisfied with the predefined condition once the memory device 20 is ever used.

Figure 9B:
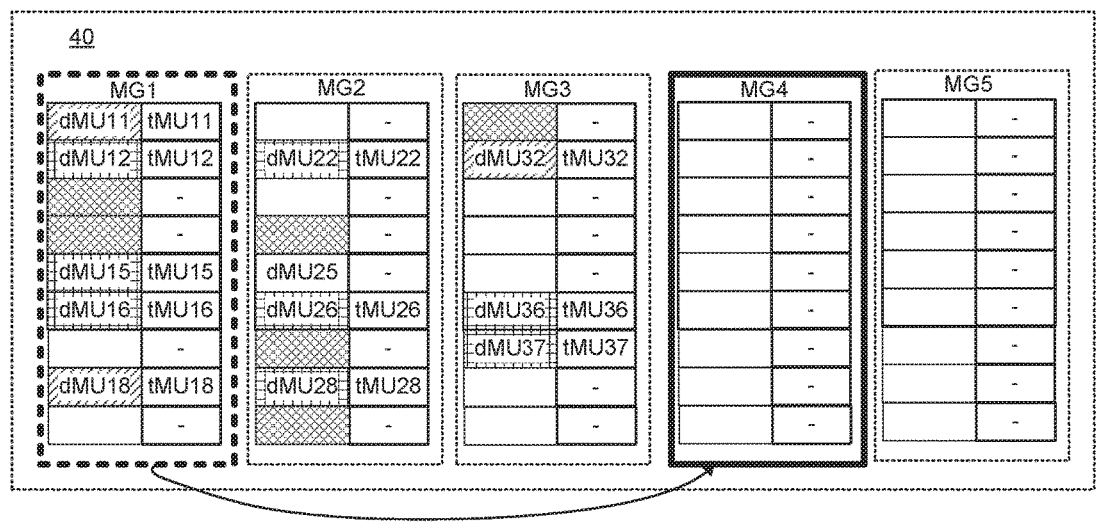
FIG. 9B is a schematic diagram illustrating that data content of the memory group being identified as risky based on the first exemplary identification rule needs to be copied to an empty memory group.

FIG. 9B is a schematic diagram illustrating that data content of the memory group being identified as risky based on the first exemplary identification rule needs to be copied to an empty memory group. In FIG. 9B, it is assumed that execution of step S231 (in FIG. 6) shows that the oldest memory group is the memory group MG1 and the bits fail ratio of the memory group MG1 is greater than the ratio threshold ERRth. Therefore, the control circuit 23 needs to perform the refresh program operation to the memory group MG1. The refresh program operation ensures that the data content of the memory group MG1 at the risky stage can be safely backed up. In FIG. 9B, the memory group MG4 is selected as the destination memory group MGdst so that the data content of the memory group MG1 can be copied to the memory group MG4.

Figure 10A:
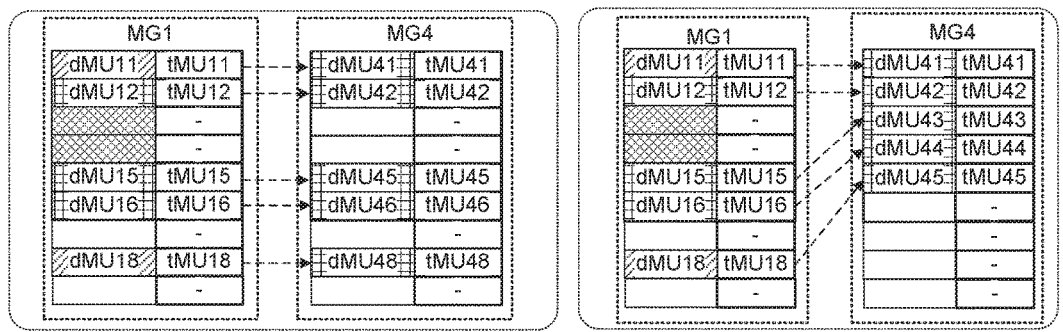
FIG. 10A is a schematic diagram illustrating an example showing how the destination memory group is programmed.

FIG. 10A is a schematic diagram illustrating an example showing how the destination memory group is programmed. The data content originally stored in the memory units MU in the source memory group (MGsrc=MG1) are copied to their corresponding positions in the destination memory group (MGdst=MG4). That is, data content originally stored in the memory unit MU11 is copied to the memory unit MU41, data content originally stored in the memory unit MU12 is copied to the memory unit MU42, data content originally stored in the memory unit MU15 is copied to the memory unit MU45, data originally stored in the memory unit MU16 is copied to the memory unit MU46, and data originally stored in the memory unit MU18 is copied to the memory unit MU48.

According to the embodiment of the present disclosure, an updated current timestamp is acquired and programmed to the spare area of the memory units MU41, MU42, MU45, MU46, and MU48 while data contents are programmed to the storage area of the memory units MU41, MU42, MU45, MU46, and MU48. Because the memory units MU41, MU42, MU45, MU46, and MU48 are programmed at the same time, the timestamps newly stored at the memory units MU41, MU42, MU45, MU46, and MU48 will be identical.

Figure 10B:
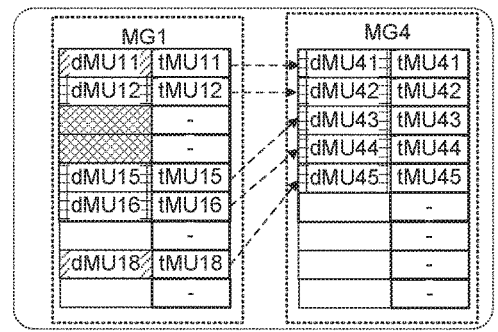
FIG. 10B is a schematic diagram illustrating another example showing how the destination memory group is programmed.

FIG. 10B is a schematic diagram illustrating another example showing how the destination memory group is programmed. The data content originally stored in the memory units MU in the memory group MG1 are sequentially copied to the memory units in the memory group MG4. That is, data content originally stored in the memory unit MU11 is copied to the memory unit MU41, data content originally stored in the memory unit MU12 is copied to the memory unit MU42, data content originally stored in the memory unit MU15 is copied to the memory unit MU43, data content originally stored in the memory unit MU16 is copied to the memory unit MU44, and data content originally stored in the memory unit MU18 is copied to the memory unit MU45.

According to the embodiment of the present disclosure, an updated current timestamp is acquired and programmed to the spare area of the memory units MU41~MU45 while data contents are programmed to the storage area of the memory units MU41~MU45. Because the memory units MU41~MU45 are programmed at the same time, the timestamps newly stored at the memory units MU41~MU45 will be identical.

Figure 11:
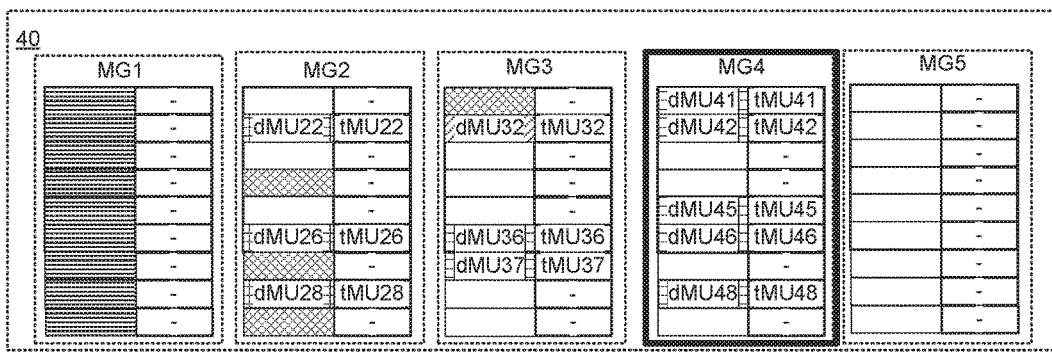
FIG. 11 is a schematic diagram illustrating the memory device after the memory group being identified as risky is actually retired based on the first exemplary identification rule.

FIG. 11 is a schematic diagram illustrating the memory device after the memory group being identified as risky is actually retired based on the first exemplary identification rule. The memory group MG4 now stores the data content originally stores at the memory group MG1. The memory group MG1 is now labeled as retired and shown in horizontal stripes.

Figure 12:
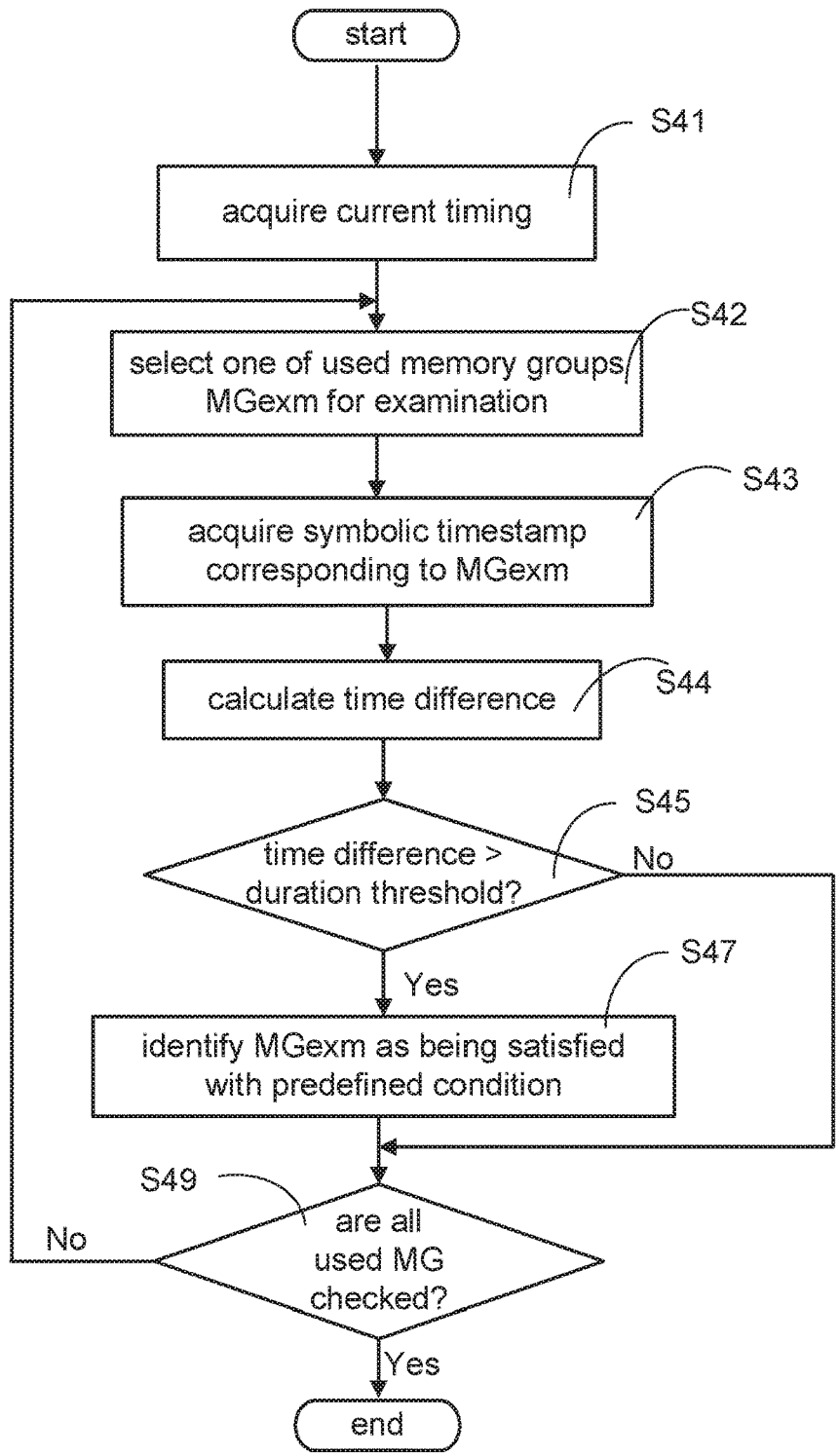
FIG. 12 is a schematic flow diagram illustrating another exemplary identification rule.

FIG. 12 is a schematic flow diagram illustrating another exemplary identification rule. Firstly, the current timestamp is acquired from the host or the timer (step S41). One of the used memory groups is selected as the memory group under examination MGexm (step S42), and the symbolic timestamp tMGsym corresponding to the memory group under examination MGexm is acquired (step S43). Then, a time difference between a time point represented by the symbolic timestamp tMGsym and another time point represented by the current timestamp is calculated (step S44). Whether the time difference is greater than the duration threshold Tcld_th is determined (step S45).

The duration threshold Tcld_th is a predefined value and can be adjusted in response to the duration that the memory device 20 is in use. For example, the duration threshold Tcld_th can be set to be a threshold value when the memory device 20 is just manufactured, and the duration threshold Tcld_th can be set to be anther threshold value after the memory device 20 has been used for a year.

If the determination result of step S45 is negative, it is determined whether there is more memory group MG needs to be identified (step S49). If the determination result of step S45 is positive, the memory group under examination MGexm is identified as being satisfied with the predefined condition (step S47). After step S47, it is determined whether there is more used memory group needs to be examined (step S49). If the determination result of step S49 is positive, the flow ends. Otherwise, step S42 is repeatedly executed.

According to the second example of the identification rule shown in FIG. 12, the number of selected memory groups may vary. Based on the second example of the identification rule, it is possible that no memory group MG is selected when the memory device 20 is relatively new. Relatively, it is possible that multiple memory groups MG are selected when the memory device 20 is relatively old.

Figures 13, 14:
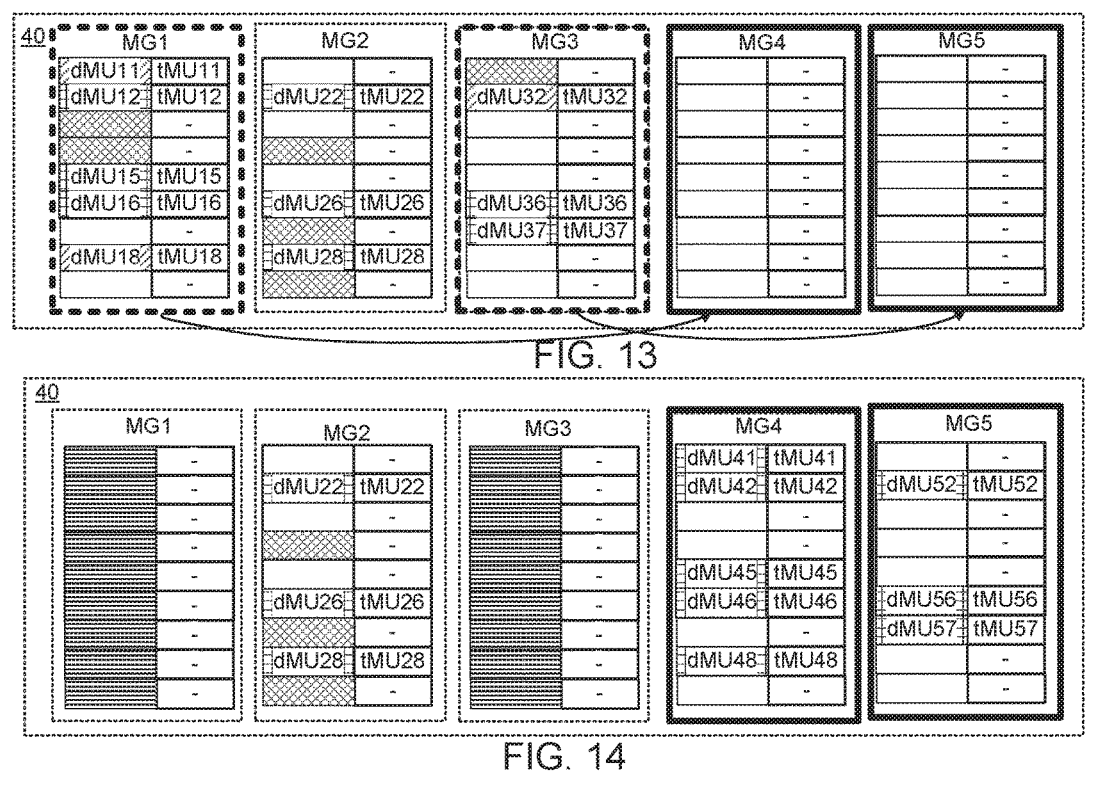

FIG. 13 is a schematic diagram illustrating that data content of the memory groups being identified as risky based on the second exemplary identification rule needs to be copied to an empty memory group. In FIG. 13, it is assumed that the memory groups MG1 and MG3 are identified as risky and none of the memory groups MG1 and MG3 passes the retention check examination. Therefore, the memory groups MG1 and MG3 are set as source memory groups MGsrc, and the memory groups MG4 and MG5 are selected as the destination memory groups MGdst.

FIG. 14 is a schematic diagram illustrating the memory device after memory group being identified as risky is actually retired based on the second exemplary identification rule. The memory group MG4 now stores the data content originally stored at the memory group MG1, and the memory group MG5 now stores the data content originally stored at the memory group MG3. The memory groups MG1 and MG3 are now labeled as retired and shown in horizontal stripes.

The predefined condition being defined in the first exemplary identification rule intends to find the earliest programmed memory group based on the recorded timestamp. The predefined condition being defined by the second exemplary identification rule intends to find the memory group(s) whose duration after being programmed has exceeded the duration threshold Tcld_th.

The implementation of the control method is flexible in many aspects. For example, the format and storage place of the timestamp, the definition of the predefined condition in the identification rule, the ratio threshold ERRth, the duration threshold Tcld_th, selection of the symbolic timestamp tMGsym, execution of the refresh program operation and so forth. As illustrated above, the control method applied to the memory device identifies whether the memory group is risky and retires the memory group if necessary. Therefore, the data safety of the memory group MG can be prevented from losing.

As illustrated above, data content of the memory group being identified as risky and whose bits fail ratio is too high is copied out prior the memory group actually changes to the failure stage. Because the data content of the retired memory group is safely copied out and the retired memory group is not further programmed, data safety of the memory device is secured. In other words, the memory group does not actually enter the failure stage because the memory group will be identified when it is risky and being retired if necessary.

While the disclosure has been described by way of example and in terms of the preferred embodiment(s), it is to be understood that the disclosure is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A memory device, comprising:
    a memory array comprising a first memory group, wherein the first memory group comprises at least one first memory unit; and
    a control circuit, electrically connected to the memory array, for recording a first timestamp corresponding to a first time point when one of the at least one first memory unit is programmed, identifying state of the first memory group based on the first timestamp and an identification rule, and retiring the first memory group when a condition being predefined in the identification rule is satisfied, wherein satisfaction of the predefined condition is related to a time difference between a current time point and the first time point.

2. The memory device according to claim 1, wherein
    the control circuit performs a retention examination to the first memory group, and
    the control circuit retires the first memory group based on satisfaction of the predefined condition and result of the retention examination.

3. The memory device according to claim 2, wherein
    the control circuit retires the first memory group when the predefined condition is satisfied and when the result of the retention examination shows that a bits fail ratio of the at first memory group is greater than or equivalent to a ratio threshold.

4. The memory device according to claim 1, wherein the memory array further comprising:
    a second memory group, comprising at least one second memory unit, wherein
    the control circuit records a second timestamp corresponding to a second time point when one of the at least one second memory unit is programmed.

5. The memory device according to claim 4, wherein the control circuit identifies which of the first memory group and the second memory group is at a risky stage based on the recorded first timestamp, the recorded second timestamp and the identification rule.

6. The memory device according to claim 1, wherein the control circuit
    acquires the first time point from the recorded first timestamp; and
    calculates the time difference.

7. The memory device according to claim 6, wherein the predefined condition is satisfied when the time difference is greater than or equivalent to a duration threshold.

8. The memory device according to claim 1, wherein the first time point is generated by the control circuit or received from a host, wherein the host is electrically connected to the memory device.

9. The memory device according to claim 1, wherein
    the at least one first memory unit is located at an initial address in the first memory group, a final address in the first memory group, or a randomly selected address in the first memory group.

10. The memory device according to claim 1, wherein the memory array further comprises:
a third memory group, comprising at least one third memory unit, wherein
the third memory group is empty when the control circuit identifies the state of the first memory group, wherein
the control circuit programs data content of the first memory group to the third memory group when the state of the first memory group is at a risky stage, records a third timestamp corresponding to a third time point when the data content of the first memory group is programmed to the third memory group, and retires the first memory group.

11. A control method applied to a memory device comprising a plurality of memory groups, wherein a first memory group among the plurality of memory groups comprises at least one first memory unit, and the control method comprises steps of:
recording a first timestamp corresponding to a first time point when one of the at least one first memory unit is programmed;
identifying state of the first memory group based on the first timestamp and an identification rule; and
retiring the first memory group when a condition being predefined in the identification rule is satisfied, wherein satisfaction of the predefined condition is related to a time difference between a current time point and the first time point.

12. The control method according to claim 11, further comprises a step of:
performing a retention examination to the first memory group; and
retiring the first memory group based on satisfaction of the predefined condition and result of the retention examination.

13. The control method according to claim 12, wherein
the first memory group is retired when the predefined condition is satisfied and when the result of the retention examination shows that a bits fail ratio of the at first memory group is greater than or equivalent to a ratio threshold.

14. The control method according to claim 11, wherein a second memory group among the plurality of memory groups comprises at least one second memory unit, and the control method further comprises a step of:
recording a second timestamp corresponding to a second time point when one of the at least one second memory unit is programmed.

15. The control method according to claim 14, further comprising a step of:
identifying which of the first memory group and the second memory group is at a risky stage based on the recorded first timestamp, the recorded second timestamp and the identification rule.

16. The control method according to claim 11, wherein the step of identifying the state of the first memory group based on the first timestamp and the identification rule further comprises steps of:
acquiring the first time point from the recorded first timestamp; and
calculating the time difference.

17. The control method according to claim 16, wherein the predefined condition is satisfied when the time difference is greater than or equivalent to a duration threshold.

18. The control method according to claim 11, wherein the first time point is generated by the control circuit or received from a host, wherein the host is electrically connected to the memory device.

19. The control method according to claim 11, wherein
the at least one first memory unit is located at an initial address in the first memory group, a final address in the first memory group, or a randomly selected address in the first memory group.

20. The control method according to claim 11, wherein a third memory group among the plurality of memory groups comprises at least one third memory unit and the third memory group is empty when the state of the first memory group is identified, wherein the step of retiring the first memory group when the first timestamp is satisfied with the condition comprises steps of:
programming data content of the first memory group to the third memory group when the state of the first memory group is at a risky stage;
recording a third timestamp corresponding to a third time point when the data content of the first memory group is programmed to the third memory group; and
retiring the first memory group.

* * * * *